US012638843B2

(12) United States Patent
Kumar et al.

(10) Patent No.: US 12,638,843 B2
(45) Date of Patent: May 26, 2026

(54) SYSTEM AND METHOD OF PREDICTING FAILURES

(71) Applicant: JIO PLATFORMS LIMITED, Ahmedabad (IN)

(72) Inventors: Akansha Kumar, Hyderabad (IN); Krusheel Munnangi, Bangalore (IN); Shailesh Kumar, Hyderabad (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 510 days.

(21) Appl. No.: 18/028,545

(22) PCT Filed: Nov. 25, 2021

(86) PCT No.: PCT/IB2021/060968
§ 371 (c)(1),
(2) Date: Mar. 26, 2023

(87) PCT Pub. No.: WO2022/112991
PCT Pub. Date: Jun. 2, 2022

(65) Prior Publication Data
US 2023/0359193 A1 Nov. 9, 2023

(30) Foreign Application Priority Data

Nov. 30, 2020 (IN) .............................. 202021052165

(51) Int. Cl.
*G05B 23/02* (2006.01)
(52) U.S. Cl.
CPC ................................ *G05B 23/0283* (2013.01)
(58) Field of Classification Search
CPC .................................................. G05B 23/0283
(Continued)

(56) References Cited

U.S. PATENT DOCUMENTS

2009/0099668 A1* 4/2009 Lehman ............. G05B 19/4186
700/83
2017/0011298 A1 1/2017 Pal et al.
(Continued)

FOREIGN PATENT DOCUMENTS

CN 108492203 A 9/2018
CN 111079978 A 4/2020
WO 2016137848 A1 9/2016

OTHER PUBLICATIONS

International Search Report, PCT/IB2021/060968, mailed Mar. 4, 2022, Total Pages 03.

*Primary Examiner* — Md Azad
(74) *Attorney, Agent, or Firm* — Davé Law Group, LLC; Raj S. Davé

(57) ABSTRACT

A system and method for prediction of failures and optimization, that can provide solution available for unsupervised learning models based on limited data that can predict different types of failure and pre-failure instances. The solution provides improvement upon previous methods of labelling by marking certain days data ahead of failure as belonging to failure data which will result in reduction of noisy data and improves good working condition data. The present invention helps with improved data quality due to labelling as the proposed method models complex distributions of feature vectors accurately and are better at finding deviations from normal data distribution which is used for detecting failures. The novel solution help to analyse and categorise the type of failures for PC Pumps currently deployed in CBM Fields for which failure days in advance can be predicted.

11 Claims, 12 Drawing Sheets

(58) Field of Classification Search
USPC ........................................................... 700/80
See application file for complete search history.

(56) References Cited

U.S. PATENT DOCUMENTS

| | | | |
|---|---|---|---|
| 2017/0096889 A1* | 4/2017 | Blanckaert | .............. E21B 44/00 |
| 2019/0152011 A1 | 5/2019 | Kummari et al. | |
| 2019/0339688 A1* | 11/2019 | Cella | .......................... H04L 1/18 |
| 2020/0334577 A1* | 10/2020 | Anderson | ............ G06Q 10/063 |
| 2021/0105293 A1* | 4/2021 | Zaron | ................. H04L 63/1425 |
| 2021/0110280 A1* | 4/2021 | Akkurt | ................... G01V 1/306 |
| 2021/0319304 A1* | 10/2021 | Tawil | ....................... G01V 1/48 |

* cited by examiner

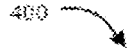

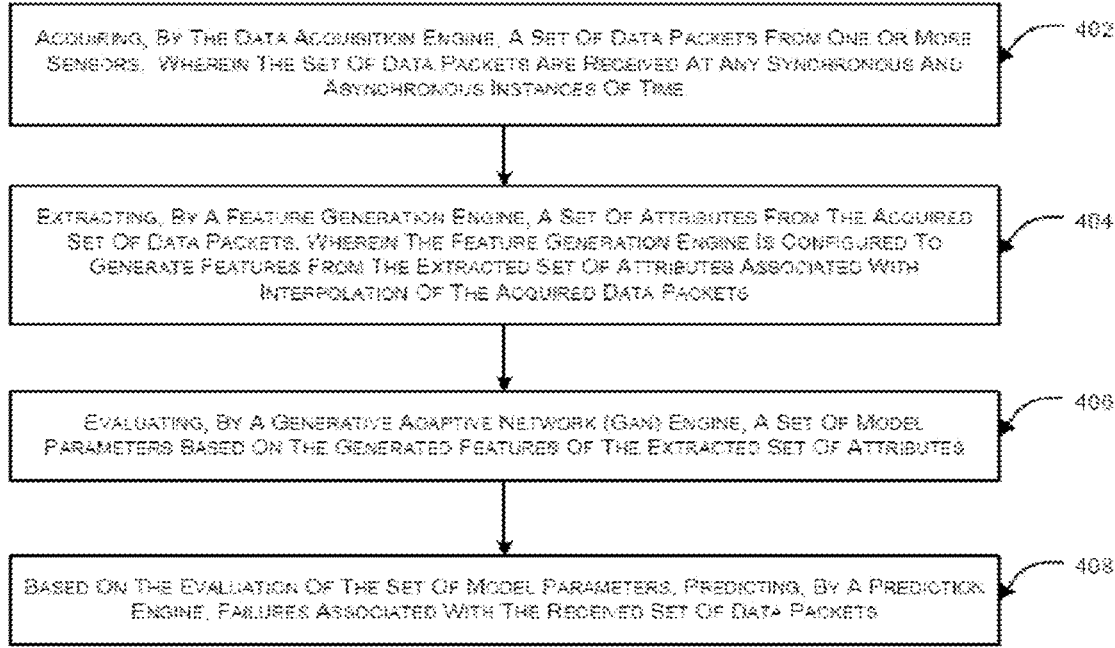

ACQUIRING, BY THE DATA ACQUISITION ENGINE, A SET OF DATA PACKETS FROM ONE OR MORE SENSORS, WHEREIN THE SET OF DATA PACKETS ARE RECEIVED AT ANY SYNCHRONOUS AND ASYNCHRONOUS INSTANCES OF TIME — 402

EXTRACTING, BY A FEATURE GENERATION ENGINE, A SET OF ATTRIBUTES FROM THE ACQUIRED SET OF DATA PACKETS, WHEREIN THE FEATURE GENERATION ENGINE IS CONFIGURED TO GENERATE FEATURES FROM THE EXTRACTED SET OF ATTRIBUTES ASSOCIATED WITH INTERPOLATION OF THE ACQUIRED DATA PACKETS — 404

EVALUATING, BY A GENERATIVE ADAPTIVE NETWORK (GAN) ENGINE, A SET OF MODEL PARAMETERS BASED ON THE GENERATED FEATURES OF THE EXTRACTED SET OF ATTRIBUTES — 406

BASED ON THE EVALUATION OF THE SET OF MODEL PARAMETERS, PREDICTING, BY A PREDICTION ENGINE, FAILURES ASSOCIATED WITH THE RECEIVED SET OF DATA PACKETS — 408

FIG. 4

PCA DIMENSIONS USING STANDARDIZED DATA

SYSTEM AND METHOD OF PREDICTING FAILURES

CROSS-REFERENCE TO RELATED APPLICATION(S)

This application is a National Stage of International Application No. PCT/IB2021/060968, filed on Nov. 25, 2021, which claims priority to Indian Patent Application number 202021052165, filed Nov. 30, 2020, the disclosures of which are hereby incorporated by reference in their entirety.

FIELD OF INVENTION

The present invention relates generally to data mining, deep learning based supervised Machine Learning for sparse labelled data availability scenarios and more particular to predicting failures and optimization for progressive cavity pumps used at Coal Based Methane Gas Wells and also prediction for various application other failures in domain of petrochemical agriculture, health and other allied industry.

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Coalbed methane (CBM or coal-bed methane), is a form of natural gas extracted from coal bedsand is an important source of energy in many countries including India. The term refers to methane adsorbed into the solid matrix of the coal. It is called 'sweet gas' because of its lack of hydrogen sulphide. The presence of this gas is well known from its occurrence in underground coal mining. Coalbed methane is distinct from a typical sandstone or other conventional gas reservoir, as the methane is stored within the coal by a process called adsorption. The methane is in a near-liquid state, lining the inside of pores within the coal (called the matrix). The open fractures in the coal (called the cleats) can also contain free gas or can be saturated with water.

To extract the gas, a steel-encased hole is drilled into the coal seam 100 to 1,500 metres (330 to 4,920 ft) below ground. As the pressure within the coal seam declines due to natural production or the pumping of water from the coalbed, both gas and produced water come to the surface through tubing as shown in the FIG. 1A. Then the gas is sent to a compressor station and into natural gas pipelines. Both gas and produced water are carried by a progressive cavity pump (PCP). The PCP is a type of positive displacement pump and is also known as a progressing cavity pump, progg cavity pump, eccentric screw pump or cavity pump. The PCP consists of a stator and a rotor, while the PCP system consists of PCP along with all the surface equipment like drive head and sub-surface equipment like Tubing, Sucker rods, Tag Anchor/No turn tool etc. It transfers fluid by means of the progress, through the pump, of a sequence of small, fixed shape, discrete cavities, as its rotor is turned. This leads to the volumetric flow rate being proportional to the rotation rate (bidirectionally) and to low levels of shearing being applied to the pumped fluid. The PCP has its application in various sectors such as Food and drink pumping, Oil pumping, Coal slurry pumping, Sewage and sludge pumping, Viscous chemical pumping, Stormflow screening, Down-hole mud motors in oilfield directional drilling (it reverses the process, turning the hydraulic into mechanical power), Limited energy well water pumping, etc. Artificial lift is used to lower the producing bottomhole pressure (BHP) on the formation to obtain a higher production rate from the well. This can be done with a positive-displacement down-hole pump, such as a beam pump, a progressive cavity pump (PCP) or a downhole centrifugal pump, to lower the bottom hole pressure in the Reservoir.

The initial operational goal of all CBM wells is to de-pressure the reservoir by continuously producing water at a low flowing bottom hole pressure. The PCP's are chosen because of the following key operational benefits—

Solids handling capability of PCP.

Capability to tolerate high percentages of free gas.

Low maintenance.

Low cost.

Gas is being produced by dewatering the CBM wells with the help of artificial lift system. Progressive cavity pump (PCP) System is used as the artificial lift in all wells. For optimization of gas production, it is very important to minimize the downtime of PCP operation.

However, PCP pumps may fail. The failure of the PCP pumps at the CBM wells accounts for over 70-80% of all wellsite failures and causes approximately 40 days of downtime per well annually as per the statistical reports. The String integrity issues (Sucker rod and/or Tubing string failure) have been the most prominent cause of unplanned work overs, which, if prevented by improved monitoring, can lead to improved run times and lesser cost. In a CBM Field PCP system failures are the major source of downtime in well production life and enabling early prediction will considerably reduce downtime.

These failures result in a high total cost-per-unit. Hence, predicting failures accurately is the prime important goal to achieve consistent production and predict pump failures in advance to optimize maintenance crew deployment and replacement part preparation, thereby reducing costs. The type of String integrity failures in PCP System in CBM Field will fall under one of the below categorizations:—

1. Tubing Puncture

2. Sucker rod Unscrew/Snap or Tubing Unscrew/Snap

The PCP pumps used at Coal Based Methane Gas Wells are subjected to wear and tear and subsequent failure of components or the well as whole results in operational loss and business. Either a components failure or multiple components failure or accumulation of sand can cause operational loss. Depending on cause of failure, type of failure (tubing integrity, sand cleaning, pump failure, sand and pump, sucker rod integrity etc.), the failures need to be labelled and defined also. In a CBM Field PCP system failures are the major source of downtime in well production life and enabling early prediction will considerably reduce downtime.

The supervised Machine learning models can be used for identifying and predicting failures. But, such supervised learning models requires data corresponding to different types of failure and pre-failure instances. It may not be feasible to have data for all types of failure and models built from limited data and hence predicting failures may not be accurate for which data is not available. Currently, there are no solutions available for unsupervised learning models based on limited data that can predict different types of failure and pre-failure instances. There are also no solutions available that helps with improved data quality due to labelling as the proposed method models complex distributions of feature vectors accurately and are better at finding deviations from normal data distribution which is used for detecting failures. Further, there are no solution that improves upon previous methods of labelling by marking certain days data ahead of failure as belonging to failure data which will result in reduction of noisy data and improves good working condition data. Another limitation in the current technology is, there is no solution to analyse and categorize the type of failures for PC Pumps currently deployed in CBM Fields for which failure days in advance can be predicted. Furthermore, there is no solution for a better optimal solution to increase the accuracy of prediction and where false positive and false negative should be minimal.

There is, therefore, a requirement in the art for a methodology to optimise production based on limited data that can predict different types of failure and pre-failure instances associated with gas extraction components.

OBJECTS OF THE PRESENT DISCLOSURE

An object of the present invention is to provide method and system that can provide solution available for supervised learning models based on limited data that can predict different types of failure and pre-failure instances.

Another object of the present invention is to provide solution that improves upon previous methods of labelling by marking certain days data ahead of failure as belonging to failure data which will result in reduction of noisy data and improves good working condition data.

Another object of the present invention is to provide solution that helps with improved data quality due to labelling as the proposed method models complex distributions of feature vectors accurately and are better at finding deviations from normal data distribution which is used for detecting failures.

An object of the present invention is to provide method and system to intelligently identify solution to improve upon the approaches that addresses the limited or non-availability of failure data.

Another object of the present invention is to provide solution that help to analyse and categorise the type of failures for PC Pumps currently deployed in CBM Fields for which failure days in advance can be predicted.

Another object of the present invention is to provide solution that help with the prediction of the failures in the Progressive Cavity Pump (PCP) used in Coal Bed Methane (CBM) wells for gas extraction.

Another object of the present invention is to provide solution that help to analyse and categorize the type of failures for any similar equipment for which failure days in advance can be predicted.

Another object of the present invention is to provide a better optimal solution to increase the accuracy of prediction and where false positive and false negative should be minimal.

Another object of the present invention is to provide a solution that can cut down lease operating expense of equipments, decrease deferred production of gas, reduce non-productive time, alleviate hiring constraints, improve cash flow in uncertain environment and provide sustainable economic production, maximize reserves recovery, etc. by predicting the failures of equipment.

Yet another object of the present invention is to mechanism to provides a seamless enhancement of prediction analysis to provide informative output for precision and decision services on wireless network including but not limited to 5G/4G/3G/EV-Do/cHRPD capable technology.

Yet another object of the present invention is to mechanism to provides a seamless enhancement of prediction optimization analysis to provide informative output for precision and decision services in the user devices independent of whether the UE is 5G/4G/3G/EV-Do/cHRPD capable technology.

Another object of the present invention is to provide value-added services to explorers by predicting the operational challenge and save cost.

SUMMARY

This section is provided to introduce certain objects and aspects of the present invention in a simplified form that are further described below in the detailed description. This summary is not intended to identify the key features or the scope of the claimed subject matter.

In order to achieve the aforementioned objectives, in an aspect, the present invention provides a system and method for facilitating prediction of wear and tear and subsequent failure of components associated with gas extraction in a mining well. The system may include one or more user equipment communicatively coupled to the mining well for gas extraction and one or more sensors coupled to one or more pumps in the mining well. The one or more user equipment may further include one or more processors that execute a set of executable instructions that are stored in a memory, upon which execution, the processor may cause the system to acquire a set of data packets from one or more sensors, by a data acquisition engine, where the set of data packets may be received at any synchronous and asynchronous instances of time and extract a set of attributes, by a feature generation engine, from the synchronised data packets. The feature generation engine maybe configured to generate features from the extracted set of attributes associated with interpolation of the received data packets. The processor may also cause the system to evaluate, by a generative adaptive network (GAN) engine, a set of model parameters based on the generated features of the extracted set of attributes and based on the evaluation of the set of model parameters, predict, by a prediction engine, failures associated with the received set of data packets.

In an aspect, the present invention provides a method for facilitating prediction of wear and tear and subsequent failure of components associated with gas extraction in a mining well. The method may include the steps of acquiring, by a data acquisition engine, a set of data packets from one or more sensors, where the set of data packets may be received at any synchronous and asynchronous instances of time; extracting, by a feature generation engine, a set of attributes from the acquired set of data packets, where the feature generation engine may be configured to generate features from the extracted set of attributes associated with interpolation of the acquired data packets; evaluating, by a generative adaptive network (GAN) engine, a set of model parameters based on the generated features of the extracted set of attributes and based on the evaluation of the set of model parameters, predict, by a prediction engine, failures associated with the received set of data packets.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 4 illustrates exemplary method flow diagram (400) depicting a method for prediction of failures, in accordance with an embodiment of the present disclosure.

BRIEF DESCRIPTION OF INVENTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Figure 1A:
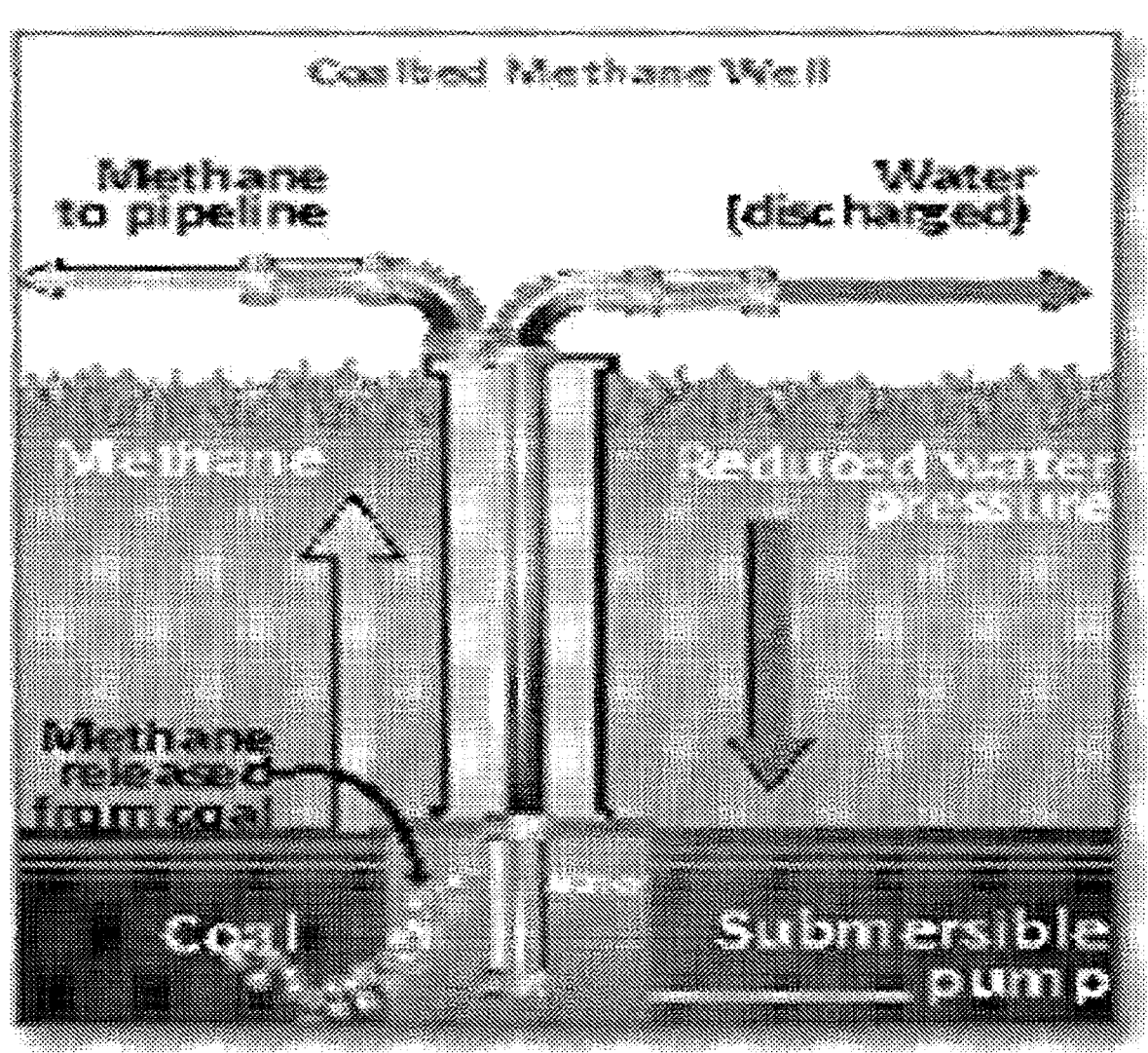
FIG. 1A illustrates a coal bed methane well, in accordance with an embodiment of the present disclosure.
Figure 1B:
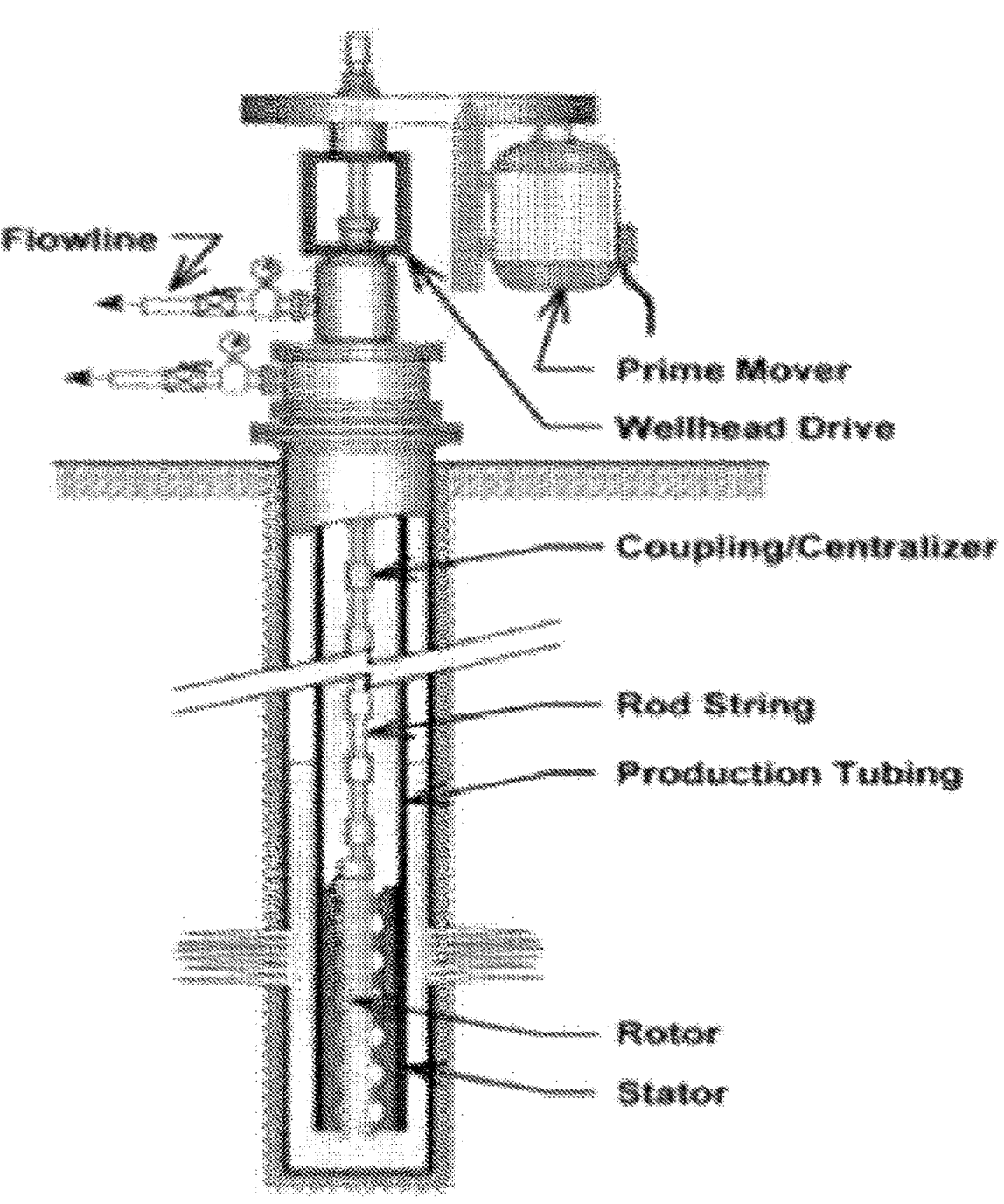
FIG. 1B illustrates a typical PCP installation, in accordance with an embodiment of the present disclosure.
Figure 2A:
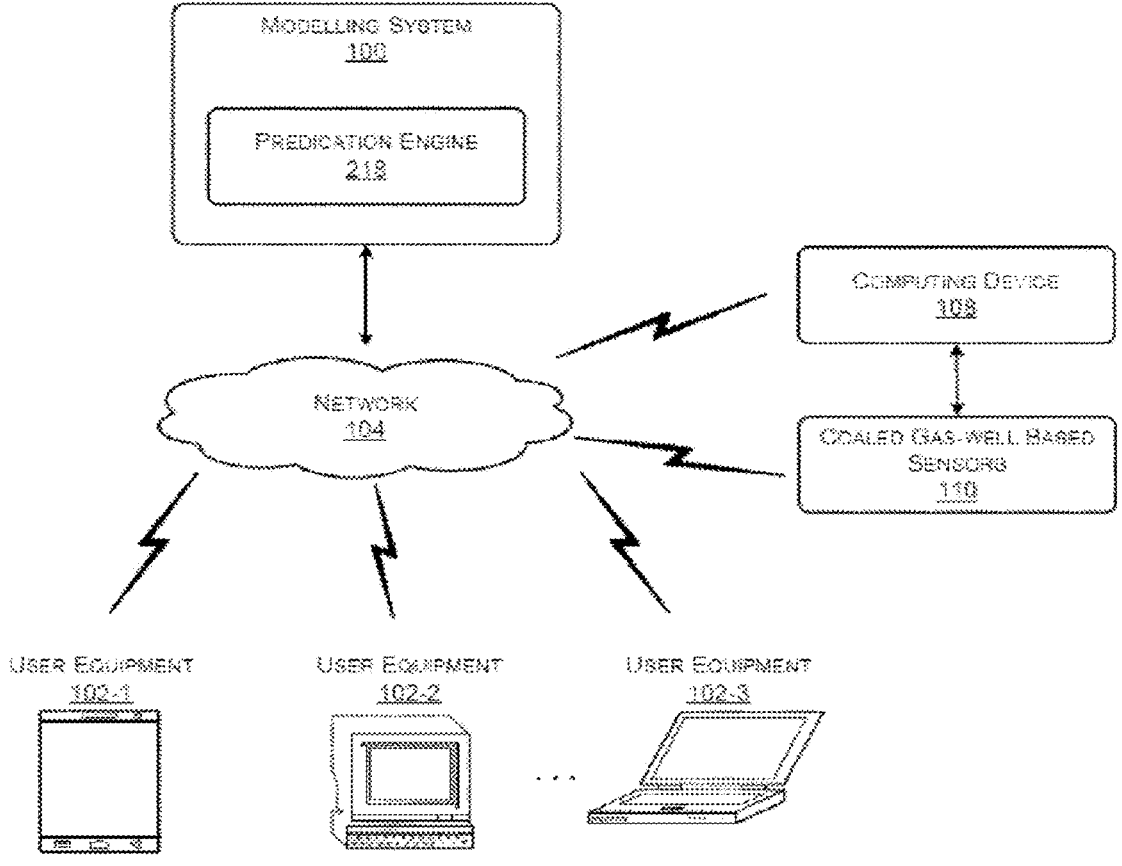
FIG. 2A illustrates an exemplary network architecture (200) in which or with which the system of the present disclosure can be implemented, in accordance with an embodiment of the present disclosure.

Referring to FIG. 2A that illustrates an exemplary network architecture 100 in which or with which system 106 of the present disclosure can be implemented, in accordance with an embodiment of the present disclosure. As illustrated, the exemplary architecture 100 includes a modelling system 106 equipped with a machine learning prediction engine 218 (also referred to as prediction engine 218 hereinafter) for facilitating prediction of wear and tear and subsequent failure of components associated with gas extraction in Coal Bed Methane (CBM) wells. The modelling system 106 may be further coupled to one or more user equipment 102-1, 102-2, 102-3 . . . 102-n (collectively referred to as user equipment 102 and individually referred to as user equipment 102 hereinafter) communicatively coupled to Coal Bed Methane (CBM) wells for gas extraction. The system 106 may also be coupled to one or more sensors coupled to progressive cavity pump (PCP) in Coal Bed Methane (CBM) wells 110 (interchangeably referred to as one or more sensors 110 or sensors 110) through a network 104 to send and receive sensor data from the one or more sensors to the modelling system for processing.

In accordance with an embodiment and as illustrated in FIG. 2A, the architecture can enable prediction of failures associated with any damage or failure of components in the PCP in CBM wells, in response to which anomalies and failures are predicted. The failures are even categorised into different labels for an optimized and hassle-free gas extraction from the wells. Failures of different components may be sensed by the one or more sensors 110 and the set of data packets may be sent to the modelling system 106 coupled to the user equipment 102. Using the prediction engine 218 in the system (106), anomalies and failures can be evaluated based on received set of data packets from the one or more sensors 110.

In an embodiment, information related to failures may be accessed using the user equipment via set of instructions residing on any operating system, including but not limited to, Android™, iOS™, and the like. In an embodiment, the one or more user equipment may be any smart computing devices and correspond to any electrical, electronic, electromechanical or an equipment or a combination of one or more of the above devices. Smart computing devices may include, but not limited to, a mobile phone, smart phone, IoT Devices, virtual reality (VR) devices, augmented reality (AR) devices, pager, laptop, a general-purpose computer, desktop, personal digital assistant, tablet computer, mainframe computer, or any other computing device as may be obvious to a person skilled in the art. In general, a smart computing device is a digital, user-configured, computer networked device that can operate autonomously. A smart computing device is one of the appropriate systems for storing data and other private/sensitive information. The said device operates at all the seven levels of ISO reference model, but the primary function is related to the application layer along with the network, session and presentation layer with any additional features of a touch screen, apps ecosystem, physical and biometric security, and the like.

The smart computing devices or the user equipment may include smart phones having mobility wireless cellular connectivity device that may allow end-users to use services on 2G, 3G, 4G or 5G mobile broadband Internet connections with an advanced mobile operating system which combines features of a personal computer operating system with other features useful for mobile or handheld use. The smartphones can access the Internet, have a touch screen user interface, can run third-party apps including the capability of hosting online applications, music players and are camera phones possessing high-speed mobile broadband 4G/5G LTE internet with video calling, hotspot functionality, motion sensors, mobile payment mechanisms and enhanced security features with alarm and alert in emergencies. Mobility devices may include smartphones, wearable devices, smart-watches, smart bands, wearable augmented devices, etc. For the sake of specificity, we will refer to the mobility device to both feature phone and smartphones in this disclosure but will not limit the scope of the disclosure and may extend to any mobility device in implementing the technical solutions. The above smart devices including the smartphone as well as the feature phone including IoT devices enable the communication on the devices.

The set of data packets are transmitted by the sensors 110 through the network 104. In an exemplary embodiment which is an example but not a limitation, the network 104may be Evolved Universal Terrestrial Radio Access (E-UTRA) which is a radio access network standard meant to be a replacement of the UMTS and HSDPA/HSUPA technologies specified in 3GPP releases 5 and beyond. Unlike HSPA, LTE's E-UTRA is an entirely new air interface system, unrelated to and incompatible with W-CDMA. It provides higher data rates, lower latency and is optimized for packet data. The earlier UTRAN is the radio access network (RAN) was defined as a part of the Universal Mobile Telecommunications System (UMTS), a third-generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High-Speed Packet Access (HSPA), which provides higher data transfer speeds and capacity to associated UMTS networks. As the demand for mobile data and voice access continues to increase, research and development continue to advance the technologies not only to meet the growing demand for access, but to advance and enhance the user experience with user device. Some of the technologies that have evolved starting GSM/EDGE, UMTS/HSPA, CDMA2000/EV-DO and TD-SCDMA radio interfaces with the 3GPP Release 8, e-UTRA is designed to provide a single evolution path for providing increases in data speeds, and spectral efficiency, and allowing the provision of more functionality.

As certain way of example and not by way of limitation, the present disclosure may use a new technology NB-IoT in release 13 for 3GPP. The low-end IoT applications can be met with this technology. It has taken efforts to address IoT markets with completion of standardization on NB-IoT. The NB-IoT technology has been implemented in licensed bands. The licensed bands of LTE are used for exploiting this technology. This technology makes use of a minimum system bandwidth of 180 kHz i.e., one PRB (Physical Resource Block) is allocated for this technology. The NB-IoT can be seen as a separate RAT (Radio Access Technology). The NB-IoT can be deployed in 3 modes as: "in-band", "guard band" and "standalone". In the "in-band" operation, resource blocks present within LTE carrier are used. There are specific resource blocks reserved for synchronization of LTE signals which are not used for NB-IoT. In "guard band" operation, resource blocks between LTE carriers that are not utilized by any operator are used. In "standalone" operation, GSM frequencies are used, or possibly unused LTE bands are used. Release 13 contains important refinements like discontinuous reception (eDRX) and power save mode. The PSM (Power Save Mode) ensures battery longevity in release 12 and is completed by eDRX for devices that need to receive data more frequently.

Figure 2B:
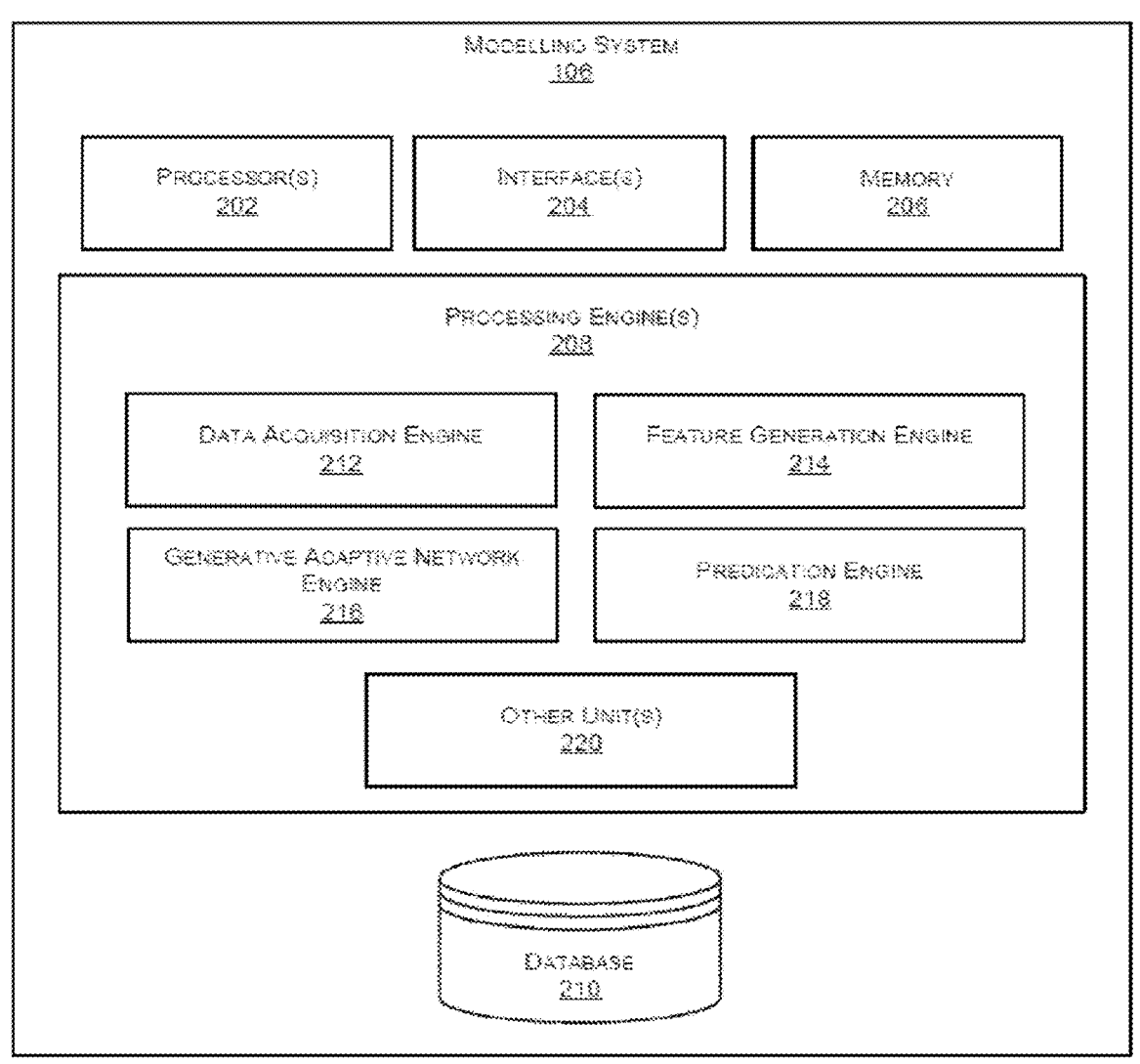
FIG. 2B illustrates an exemplary representation (200) of system (110) or a centralized server (112), in accordance with an embodiment of the present disclosure.

FIG. 2B with reference to FIG. 2A, illustrates an exemplary representation of modelling system 106/user equipment 102 for facilitating prediction of failures associated with gas extraction systems, in accordance with an embodiment of the present disclosure. In an aspect, the system (106)/user equipment 102 may comprise one or more processor(s) 202. The one or more processor(s) 202 may be implemented as one or more microprocessors, microcomputers, microcontrollers, digital signal processors, baseband digital processors, central processing units, logic circuitries, and/or any devices that process data based on operational instructions. Among other capabilities, the one or more processor(s) 202 may be configured to fetch and execute computer-readable instructions stored in a memory 204 of the system 106. The memory 204 may be configured to store one or more computer-readable instructions or routines in a non-transitory computer readable storage medium, which may be fetched and executed to create or share data packets over a network service. The memory 206 may comprise any non-transitory storage device including, for example, volatile memory such as RAM, or non-volatile memory such as EPROM, flash memory, and the like.

In an embodiment, the modelling system 106/user equipment (102) may include an interface(s) 204. The interface(s) 204 may comprise a variety of interfaces, for example, interfaces for data input and output devices, referred to as I/O devices, storage devices, and the like. The interface(s) 204 may facilitate communication of the modelling system 106. The interface(s) 204 may also provide a communication pathway for one or more components of the user equipment 102. Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) 208 may be processor executable instructions stored on a non-transitory machine-readable storage medium and the hardware for the processing engine(s) 208 may comprise a processing resource (for example, one or more processors), to execute such instructions. In the present examples, the machine-readable storage medium may store instructions that, when executed by the processing resource, implement the processing engine(s) (208). In such examples, the system 106/user equipment 102 may comprise the machine-readable storage medium storing the instructions and the processing resource to execute the instructions, or the machine-readable storage medium may be separate but accessible to the system 106/user equipment 102 and the processing resource. In other examples, the processing engine(s) 208 may be implemented by electronic circuitry.

The processing engine 208 may include one or more engines selected from any of a data acquisition engine 212, a feature generation engine 214, Generative Adaptive Network (GAN) engine 216, prediction engine 218 and other engines (220). In an embodiment, the data acquisition engine 212 may enable acquire a set of data packets from one or more sensors 110. The set of data packets may be received at any synchronous and asynchronous instances of time which are then converted to synchronous data packets by the data acquisition engine 212. In an embodiment, the feature generation engine 214 may enable to extract a set of attributes, by a feature generation engine, from the synchronised data packets. The feature generation engine may be configured to generate features from the extracted set of attributes associated with interpolation of the received data packets. The generative adaptive network (GAN) engine 216 may be configured to evaluate a set of model parameters based on the generated features of the extracted set of attributes and based on the evaluation of the set of model parameters, the prediction engine 218 may detect anomalies associated with the data packets and predict failures associated with the received set of data packets.

In an embodiment, the GAN engine 216 may include machine learning techniques where given a training set, this technique learns to generate new data with the same statistics as the training set. For example, a GAN trained on data can generate new events that look at least superficially authentic to human observers, having many realistic characteristics. Though originally proposed as a form of generative model for supervised learning, GANs have also proven useful for semi-supervised learning, unsupervised learning, and reinforcement learning. In an exemplary embodiment, the GAN engine can be configured to analyse each set of data packets received from the sensors.

In an embodiment, the prediction engine (218) may include machine learning methodologies using Gaussian process. The Gaussian process is a stochastic process (a collection of random variables indexed by time or space), such that every finite collection of those random variables has a multivariate normal distribution, i.e., every finite linear combination of them is normally distributed. The distribution of a Gaussian process is the joint distribution of all those (infinitely many) random variables, and as such, it is a distribution over functions with a continuous domain, e.g., time or space. A machine-learning algorithm that involves a Gaussian process uses lazy learning and a measure of the similarity between points (the kernel function) to predict the value for an unseen point from training data. The prediction is not just an estimate for that point, but also has uncertainty information—it is a one-dimensional Gaussian distribution (which is the marginal distribution at that point). For multi-output predictions, multivariate Gaussian processes are used, for which the multivariate Gaussian distribution is the marginal distribution at each point. The prediction engine 218 also may include artificial intelligence, cognitive modelling, and neural networks are information processing paradigms inspired by the way biological neural systems process data. Artificial intelligence and cognitive modeling try to simulate some properties of biological neural networks. In the artificial intelligence field, artificial neural networks have been applied successfully to speech recognition, image analysis and adaptive control. A neural network (NN), in the case of artificial neurons called artificial neural network (ANN) or simulated neural network (SNN), is an interconnected group of natural or artificial neurons that uses a mathematical or computational model for information processing based on a connectionist approach to computation. In most cases, an ANN is an adaptive system that changes its structure based on external or internal information that flows through the network. In more practical terms neural networks are non-linear statistical data modelling or decision-making tools. They can be used to model complex relationships between inputs and outputs or to find patterns in data. Further, the prediction engine 218 may involve optimization of the model parameters evaluated by the GAN engine 216. Optimization is the process of the determination of a set of values for the design parameters that solves a maximization or minimization function of a set of objectives derived from the quantities of interest (QOIs). The optimization of a complex system involves the determination of optimum values for a set of design parameters in order to meet a specific set of objectives based concerning the QOIs in which the design parameters are a subset of the input parameters and the QOIs are determined from the output parameters. The system can be an experiment or a computational model. Particularly, when the parameter space is large, optimization necessitates a significant number of executions of the system to obtain a desired solution in tolerance limits.

Figure 3A:
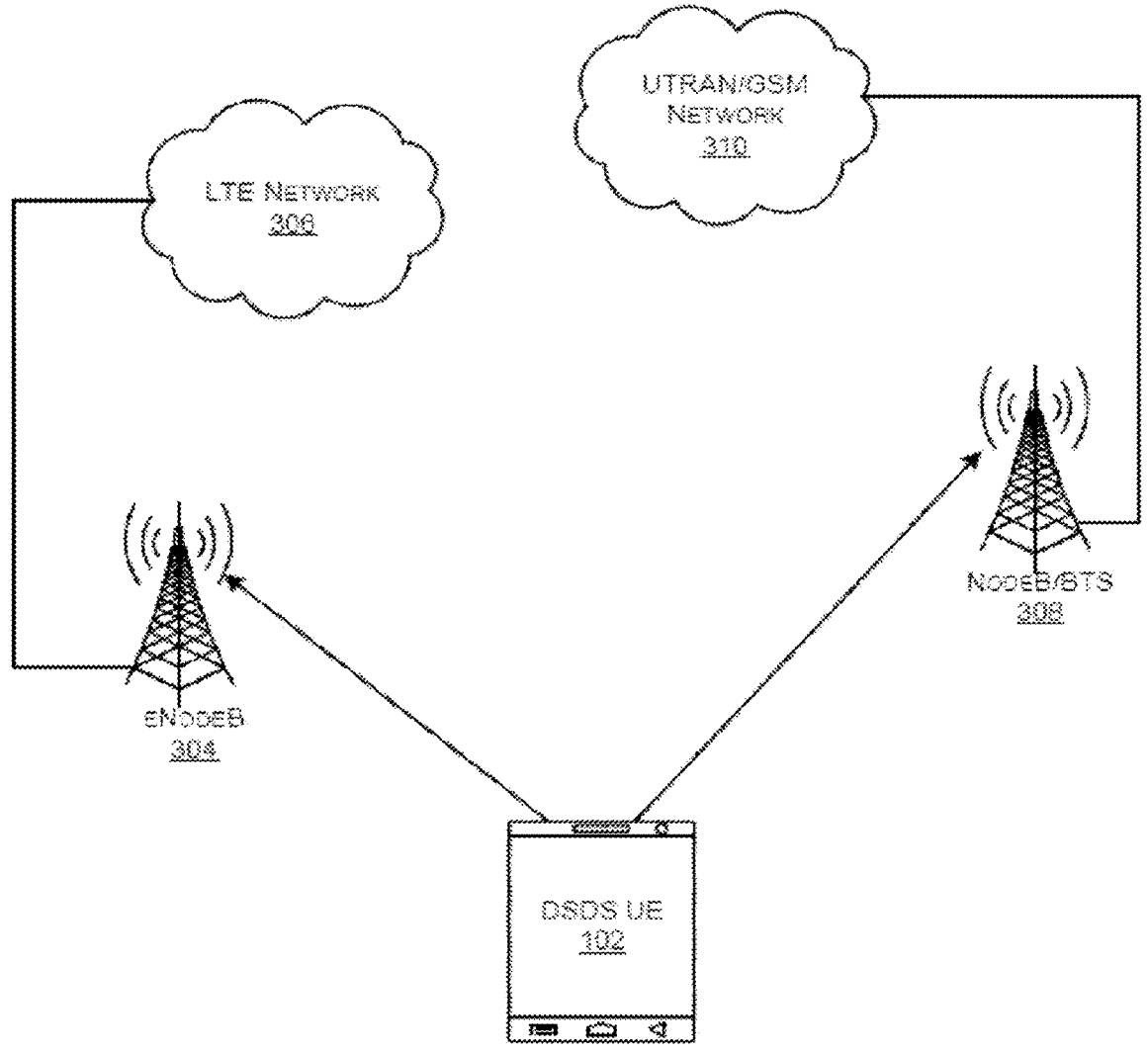
FIG. 3A illustrates an exemplary representation system architecture of user equipment latched with different RATS, in accordance with an embodiment of the present disclosure.

FIG. 3A illustrates an exemplary representation system architecture of user equipment latched with different radio access technology systems (RATS), in accordance with an embodiment of the present disclosure.

As illustrated, in an embodiment, FIG. 3A depicts system architecture of a UE/IoT concurrently latched to LTE as well as legacy (UMTS/GSM/LTE) or 5G-NR operator. In an embodiment, as illustrated in FIG. 3A, a user equipment 102 (UE) may be communicatively coupled to eNodeB 304 and NodeB or Base station (BTS) 308. The NodeB 304 may be further coupled to an LTE network 306 while BTS 308 may be associated with any or a combination of UTRAN and GSM Network 310.

Figure 3B:
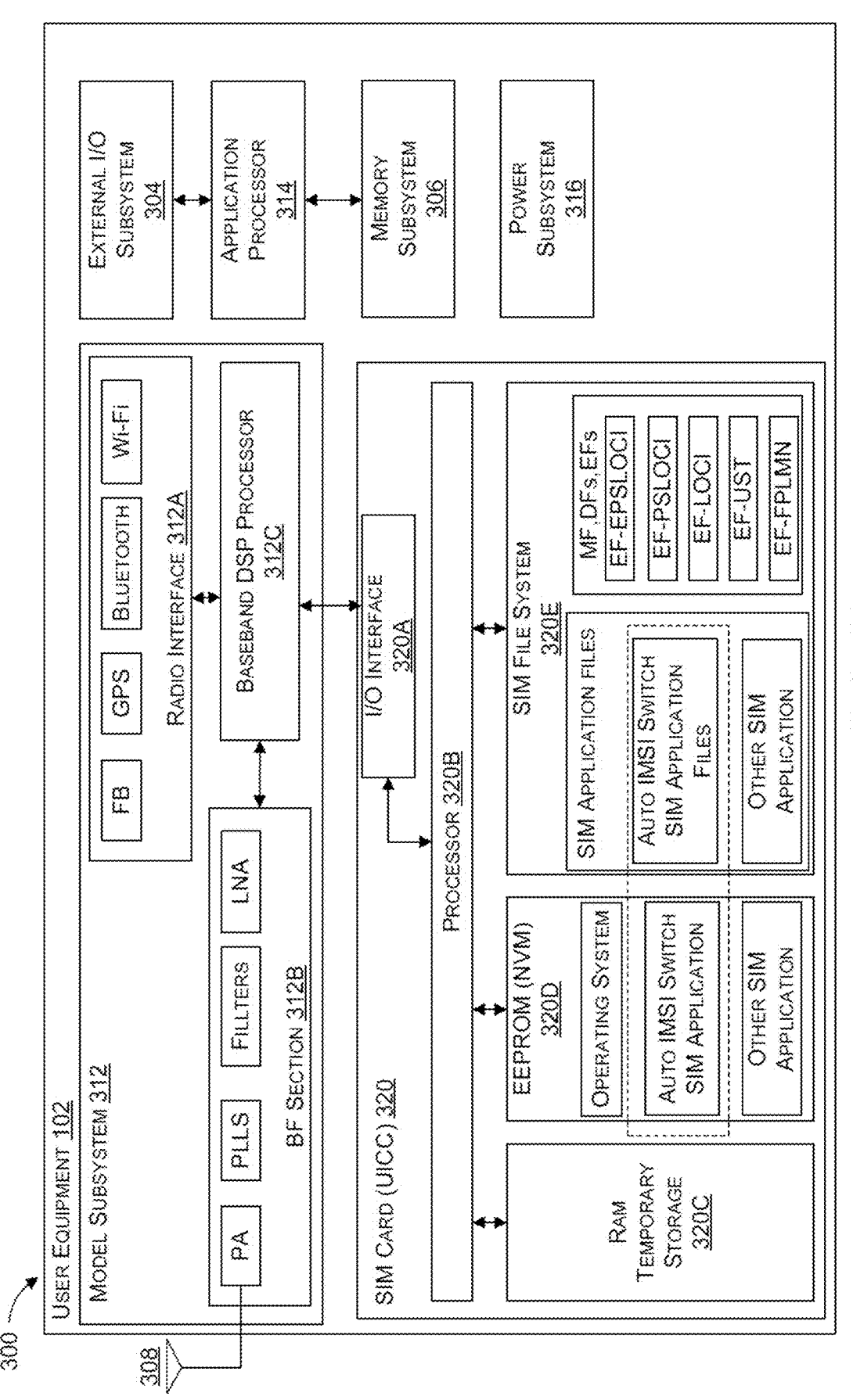
FIG. 3B illustrates an exemplary representation depicting a user equipment architecture of system, in accordance with an embodiment of the present disclosure.

FIG. 3B illustrates an exemplary representation depicting a user equipment architecture of system, in accordance with an embodiment of the present disclosure.

In another embodiment, the below schematic diagram depicts a simplified block representation of a UE 102 (Smartphone/feature phone/any other communicating device) in FIG. 3A. FIG. 3B illustrates a preferred embodiment of the present disclosure which encompasses a high-level architecture of a system 300 for availing at least one service by the user equipment 102. The system 300 may comprise the user equipment 102 and the subscriber identity engine (SIM) 320 configured inside the user equipment 102 for providing various functionalities in accordance with the present disclosure. The user equipment 102 further may comprise a plurality of subsystems [312, 312A, 320B, 312C, 304, 314, 306 and 316], wherein said subsystems [312, 312A, 320B, 312C, 304, 314, 306 and 316] may include, but not limiting to, a modem subsystem 312 with a Baseband DSP processor 312C and a plurality of radio interfaces 312A. The user equipment 102 may further include a cellular radio 102B transmission/reception radio frequency (RF) connected to the antenna 308 for receiving and transmitting wireless services such as VoIP and Internet/Intranet services. Also, the user equipment 102 may comprise an application processor 314 a memory subsystem 306, a power subsystem 316 and an external I/O interfaces subsystem 304. The present disclosure further encompasses that the subscriber identity engine 320 may comprise a processor 320B, an I/O interface 320A, a RAM temporary storage 320C, an EEPROM/Non-volatile Memory (NVM) [320D] and a SIM file system [320E]. Further, the EEPROM/Non-Volatile Memory (NVM) [320D] may consist of an operating system code, a code of other SIM applications and the Auto IMSI Switch SIM application. The SIM file system [320E] and USIM application may contain elementary files and location parameters such as EFLOCI (Location Information), EFPSLOCI (PS Location Information), EFEPSLOCI (PS Location Information) and various application-specific files used by SIM applications running on the subscriber identity engine along with a plurality of context and configuration files of the Auto IMSI Switch SIM application.

FIG. 4 illustrates exemplary method flow diagram (400) depicting a method for prediction of failures, in accordance with an embodiment of the present disclosure.

At step 402, the method includes the step of acquiring, by the data acquisition engine, a set of data packets from one or more sensors, wherein the set of data packets are received at any synchronous and asynchronous instances of time and at step 404, the method may include extracting, by a feature generation engine, a set of attributes from the acquired set of data packets, wherein the feature generation engine is configured to generate features from the extracted set of attributes associated with interpolation of the acquired data packets.

Further at step 406, the method may include the step of evaluating, by a generative adaptive network (GAN) engine, a set of model parameters based on the generated features of the extracted set of attributes and based on the evaluation of the set of model parameters, the method may include a step at 408 predicting, by a prediction engine, failures associated with the received set of data packets.

Figure 5A:
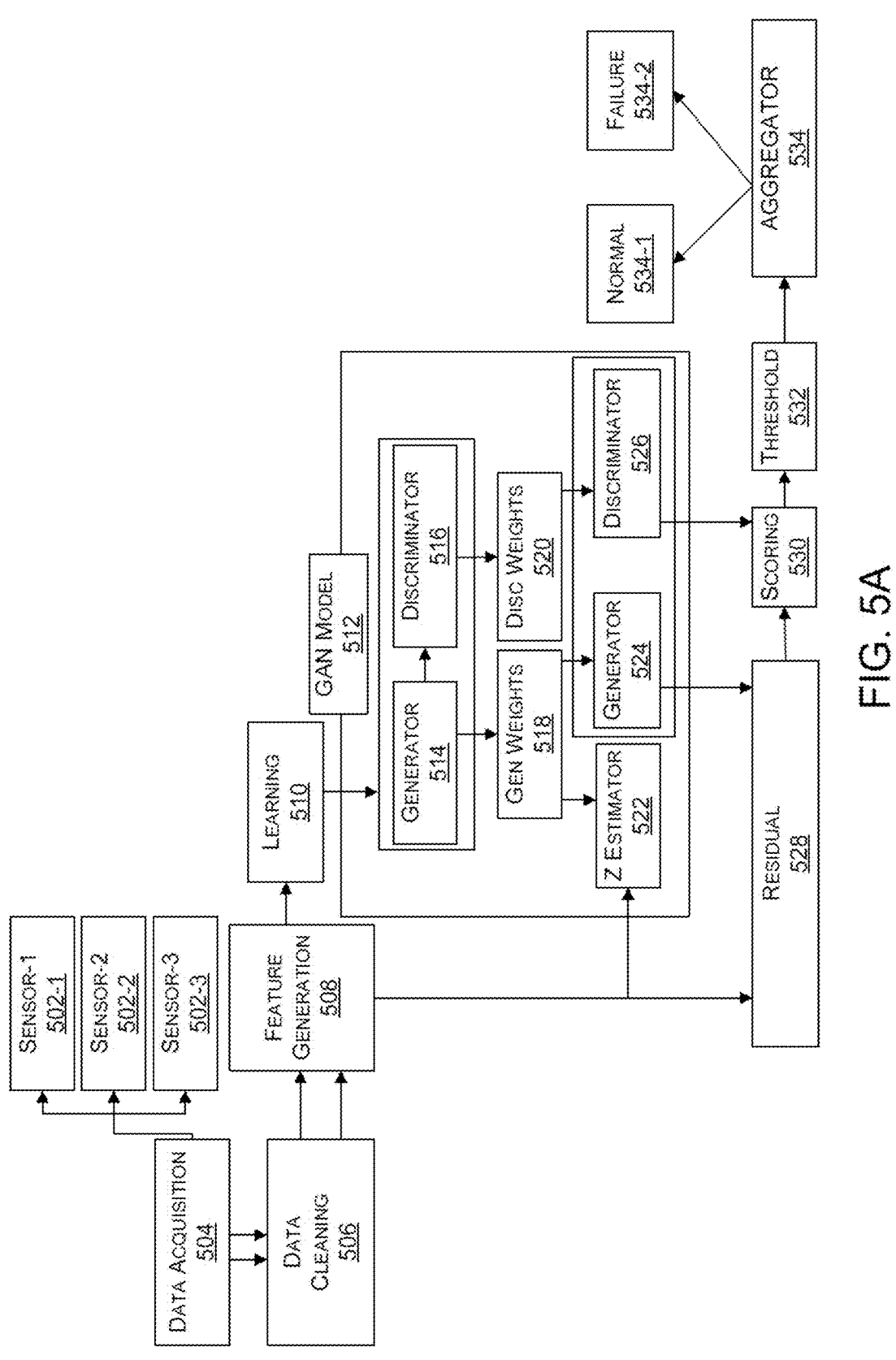
FIG. 5A illustrates an exemplary representation system architecture of General Adaptive Network (GAN) Engine, in accordance with an embodiment of the present disclosure.

FIG. 5A illustrates an exemplary representation system architecture of General Adaptive Network (GAN) Engine, in accordance with an embodiment of the present disclosure.

The above system takes sensor input 502-1, 502-2 and 502-3 as raw data for data acquisition 504, cleaning 506 and labelling 510 and feed the feature generation 508 data to the GAN optimizer engine 512 processed in parallel to provide the output for the optimized failure prediction solution. The system comprises of scenario, dynamic data and metadata tables as input and generates optimized failure prediction solution (dashboards, plots and CSV files) as output for the stakeholders to analyze and take decisions.

The above system has broadly following steps—

Feature extraction from time series of different sensors

Data labelling process

Training of GAN Models

Inference pipeline

A detailed description of each of the components are presented in the following section.

Data Acquisition 504 and cleaning 506 (Resampling and Interpolation): Each sensor emits data at a specific time interval. The time interval of data emission is different for each sensor. Apart from the time interval, instances at which data is emitted from sensors may not be synchronised. The asynchronous and irregular time interval data from different sensors is interpolated to a synchronous and regular time interval data. Let N be the number of sensors emitting data. After resampling and interpolation, an observation is set at each time instant ta set of values $$\{r_i^t\}_{i=1}^N,$$

where each dimension corresponds to a interpolated or original value from a sensor and its vector representation is $r^t$.

Features Generation 508 (Derived Features): Few features are derived by performing computations on observations of particular sensor from the interpolation step. Following types of computations are generally performed on the window of observations from sensor, depending on the performance improvements provided by those features.

1. Statistics like mean, median, kurtosis etc. on a window of observations. Computation of statistics results in a scalar value for each window of observations.
2. Frequency domain transformations like Fourier transform or time frequency transformations like wavelets etc. Output from these transformations will result in a vector of values when applied on a window of observations.

3. Dimensionality reduction like Principal Components Analysis can be applied on features extracted from steps 1 and 2 to reduce the dimensionality of feature vector to improve computational performance or robustness to noise.

Let us assume that there are M number of derived features using transformations on different features mentioned in step 1 and step 2. The derived features values are appended to the feature values from resampling and interpolation step which we call as derived feature vector. This will result in a derived feature vector with values $[\![\,[\![\,\{x\}\!]\,\_i\,^t\}\!]\,\_{(i=1)}\,^{\wedge}(M+N)$ where each dimension corresponds to a interpolated or raw signal value from a sensor or derived feature value and its vector representation is x ^t.

Figure 5B:
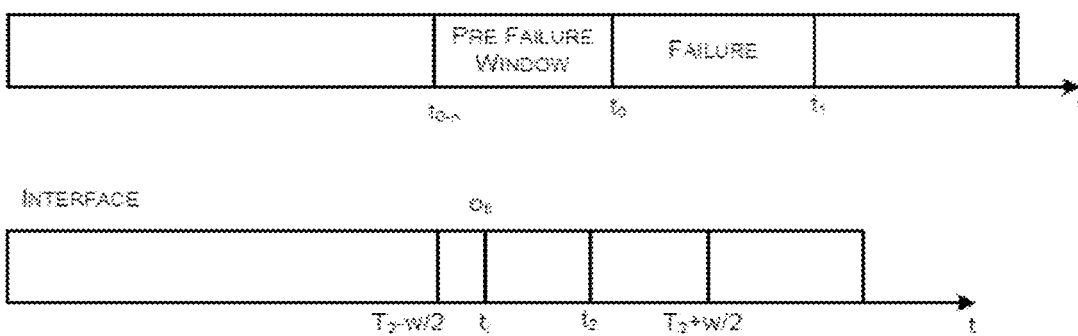
FIG. 5B illustrates an exemplary representation system architecture of Data labelling Engine, in accordance with an embodiment of the present disclosure.

FIG. 5B illustrates an exemplary representation system architecture of Data labelling Engine, in accordance with an embodiment of the present disclosure.

In an embodiment, for each gas well, workover start date $(ws^{start})$ and workover end date $(ws^{end})$ are available as a csv file which are used to mark each observation computed in feature extraction process. All observations between workover start date and workover end date are marked as failure condition data. Also, a window (W days) of observations before workover start date are also marked as failure in order to enable ahead failure prediction. All other observations outside of the window $(ws^{start}-W,ws^{end})$ are marked as observations belonging to good condition data. After labelling process we have data in the format $\{x^t, y^t\}$, where $y^t$ takes value either good or failure.

Figure 6A:
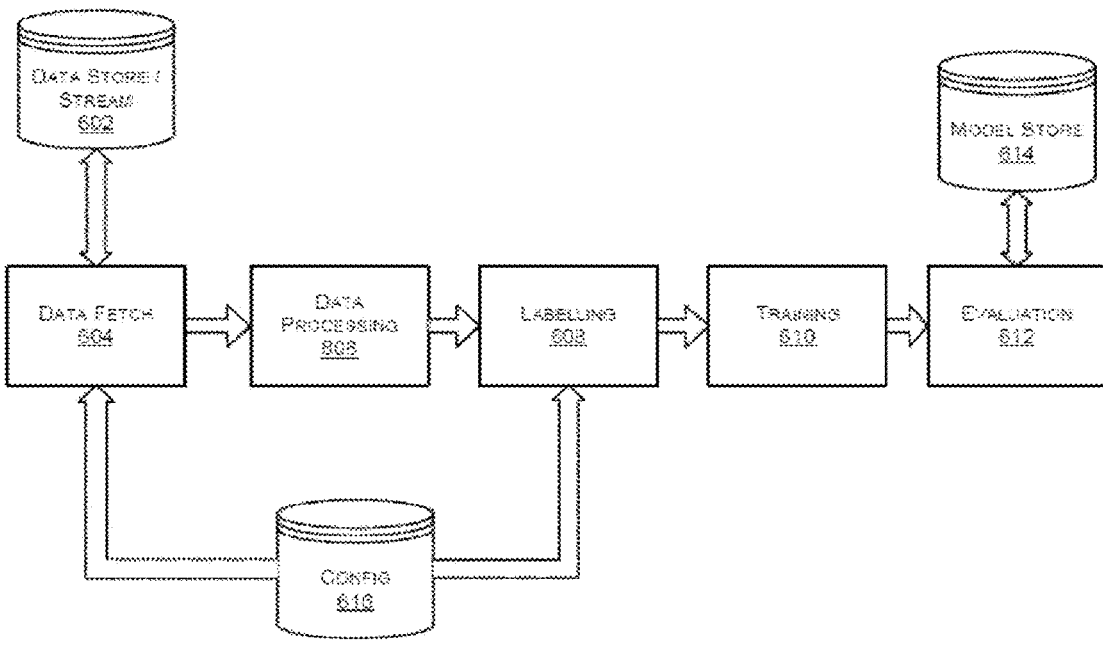
FIG. 6A illustrates an exemplary representation system architecture of GAN Training Engine, in accordance with an embodiment of the present disclosure.

FIG. 6A illustrates an exemplary representation system architecture of GAN Training Engine, in accordance with an embodiment of the present disclosure.

As illustrated, the GAN training flow is depicted in terms of a bold arrow. The bold arrow above shows the training process flow and the dotted arrow corresponds to the testing flow. After the training is done, the model parameters (weights) of Generator and Discriminator may be stored in a binary format. During the inference process, these weights may be loaded and used in the model for predictions.

During the training process as depicted below in FIG. 6A, GAN model is used for modelling variability of good working condition of gas wells. A GAN consists of adversarial engines, a generator G and a discriminator D. The generator G learns a distribution $p_g$ over data x via a mapping G(z) of samples z, 1D vectors of uniformly distributed input noise sampled from latent space, to feature space. In this setting, the network architecture is a standard neural network decoder. Let length of the vector z be $L_z$. Here, Different values of $L_z$ will be explored and chose the one which results in best performance of the model.

Discriminator D is a neural network that maps a derived feature vector to single scalar value D(·). The discriminator output D(·) can be interpreted as probability that the given input to the discriminator D was a feature vector from training data belonging to good working condition of the well or generated G(z) by the generator G. D and G are simultaneously optimized through the below two player minimax game with value function V(G, D).

$$\min_G\max_D V(D, G) = E_{x\sim p_{data}(x)}[\log D(x)] + E_{z\sim p_z(z)}[\log(1 - D(z))]$$

The discriminator is trained to maximize the probability of assigning good working condition training examples the "good" and samples from $p_g$ the "failure" label. The generator is simultaneously trained to fool D via minimizing $V(G)=\log(1-D(G(z)))$ which is equivalent to maximizing $V(G)=D(G(z))$. During adversarial training the generator improves in generating derived features in good condition and the discriminator progresses in correctly identifying good and not good features.

The Generator and Discriminator networks are trained using back propagation of gradients of loss function w.r.t different parameters in Generator G and discriminator D network. Generator and Discriminator weights are updated iteratively in training engine. In each iteration generator and discriminator weights are updated. While updating weights of a generator discriminator weights are kept constant and while updating the discriminator weights generator weights are kept constant. Number of iterations for which generator and discriminator weight updates happen is referred to as Number of epochs ($N_{epoch}$)

Discriminator: The discriminator is a binary classifier that identifies if a given sample corresponds to a normal sample or a failure sample. The samples are multi-dimensional. The terms of the variable space is difficult to visualize completely and uses an approximation using Principal Component Analysis (PCA) to reduce the dimensionality to two for visualization purposes.

ZEstimator: New Feature to Latent Space: When adversarial training is completed, the generator has learned the mapping $G(z)$ from latent space representations z to feature space of good working condition x of the CBM well. But, GANs do not automatically provide inverse mapping $\mu(x)$ from feature space to latent space. The latent space has smooth transitions, so sampling two points close in the latent space generates two similar derived features. Given a query feature x, a point z, in the latent space that corresponds to feature $G(z)$ that is similar to query feature vector x. To find the best z, $z_1$ is randomly sampled from the latent space distribution and fed into the generator to get a generated derived feature vector $G(z_1)$. Based on the generated derived feature vector $G(z_1)$ a loss function is defined, which provides gradients for the update of coefficients of $z_1$ resulting in an updated position in latent space $z_2$. In order to find the most similar image $G(z_\Gamma)$, the location of z in the latent space is optimized in an iterative process via $\gamma=1, 2, 3, \ldots, \Gamma$ back propagation steps.

A loss function for mapping a new derived feature to the latent space that comprises two components, a residual loss and a discrimination loss. The residual loss enforces the similarity between generated feature vector $G(z_\Gamma)$ and query feature vector. The Discriminative loss enforces the generated feature vector $G(z_\Gamma)$ to lie on the learned manifold. Therefore, both components of GAN are utilized to adapt the coefficients of z, via back propagation.

Residual Loss: The residual loss measures the visual dissimilarity between query feature vector x and generated feature vector $G(z_\gamma)$ in the feature space and is defined by $$L_R(z_\gamma)=\Sigma|x-G(z_\gamma)|$$

Discrimination Loss:

$$L_D(z_\gamma)=\Sigma|f(x)-f(G(z_\gamma))|$$

For the mapping to latent space, the overall loss is defined as weighted sum of both components.

$$L_D(z_\gamma)=(1-\lambda)L_R(z_\gamma)+\lambda L_D(z_\gamma)$$

Only, the coefficients of z are adapted via back propagation. The trained parameters of the generator and discriminator are kept fixed.

Figure 6B:
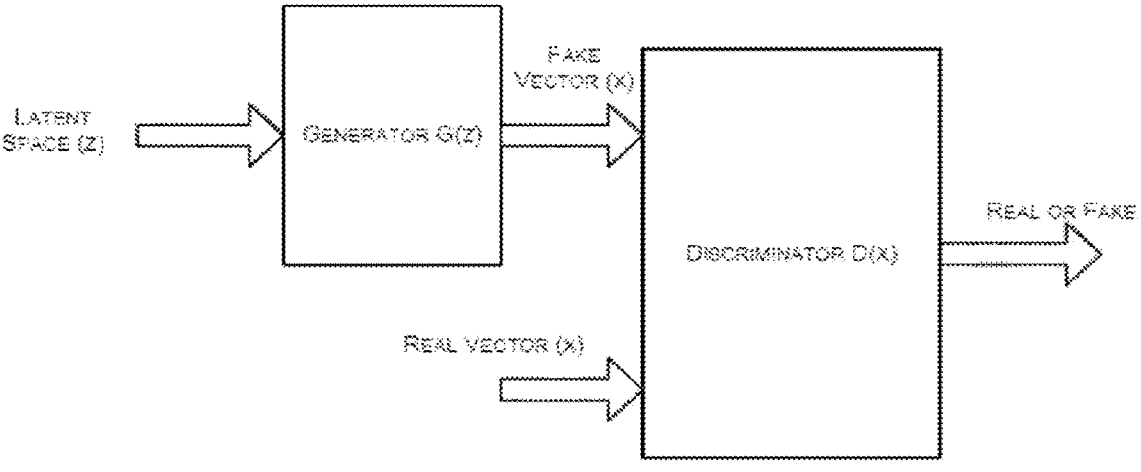
FIG. 6B illustrates an exemplary representation of flow diagram for detection of anomalies, in accordance with an embodiment of the present disclosure.

FIG. 6B illustrates an exemplary representation of flow diagram for detection of anomalies, in accordance with an embodiment of the present disclosure.

In an exemplary embodiment, during anomaly identification in new data, the new query feature vector is evaluated as belonging to normal or failure scenario as depicted in the FIG. 6B. The Loss function used for mapping to the latent space, evaluates in every update iteration $\gamma$ the compatibility of generated feature vector $G(z_\gamma)$ with feature vectors seen during adversarial training. Thus, an anomaly score, which expresses the fit of a query feature vector x to the model of good feature vector can be derived from the mapping loss function $A(x)=(1-\lambda)R(x)+\lambda D(x)$ where the residual score $R(x)$ and discriminator score $D(x)$ are defined by the residual loss $L_R(z_\Gamma)$ and the discriminator loss $L_D(z_\Gamma)$ at the last $\Gamma^{th}$ update iteration of the mapping procedure to the latent space. The model yields a large anomaly score for $A(x)$ for failure feature vector, whereas a small anomaly score means that a very similar feature vector was already seen during training. The anomaly score $A(x)$ for vector-based failure detection. Additionally, the residual vector is used for the identification of reasons of failure based on the dimensions along which residual is high.

Figure 6C:
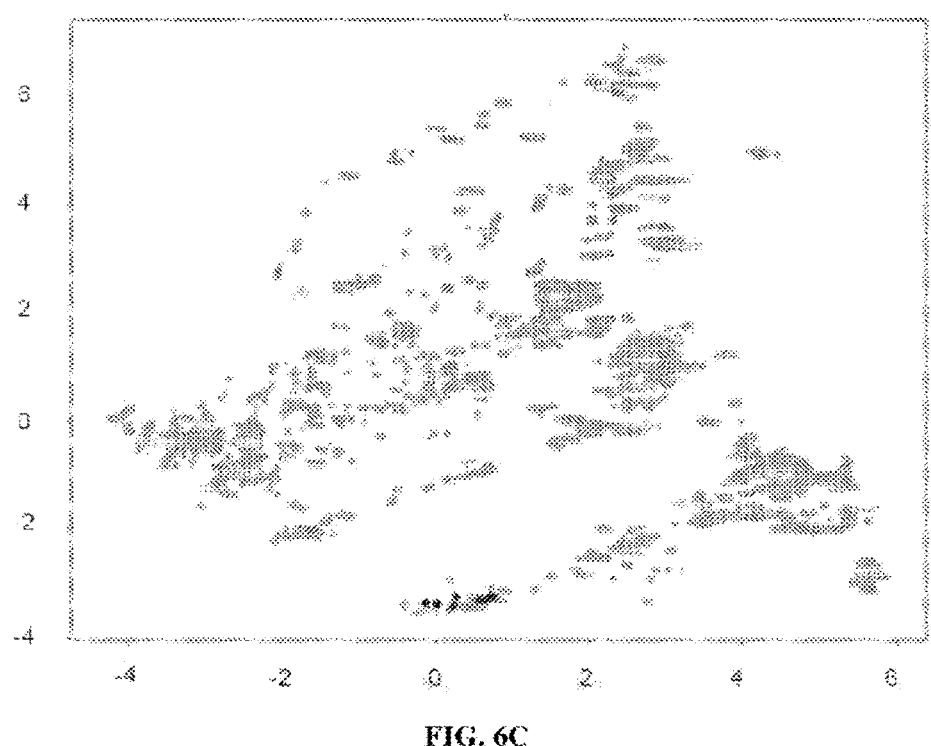
FIG. 6C illustrates an exemplary representation of a scattering plot of samples, in accordance with an embodiment of the present disclosure.

FIG. 6C illustrates an exemplary representation of a scattering plot of samples, in accordance with an embodiment of the present disclosure.

Figure 7:
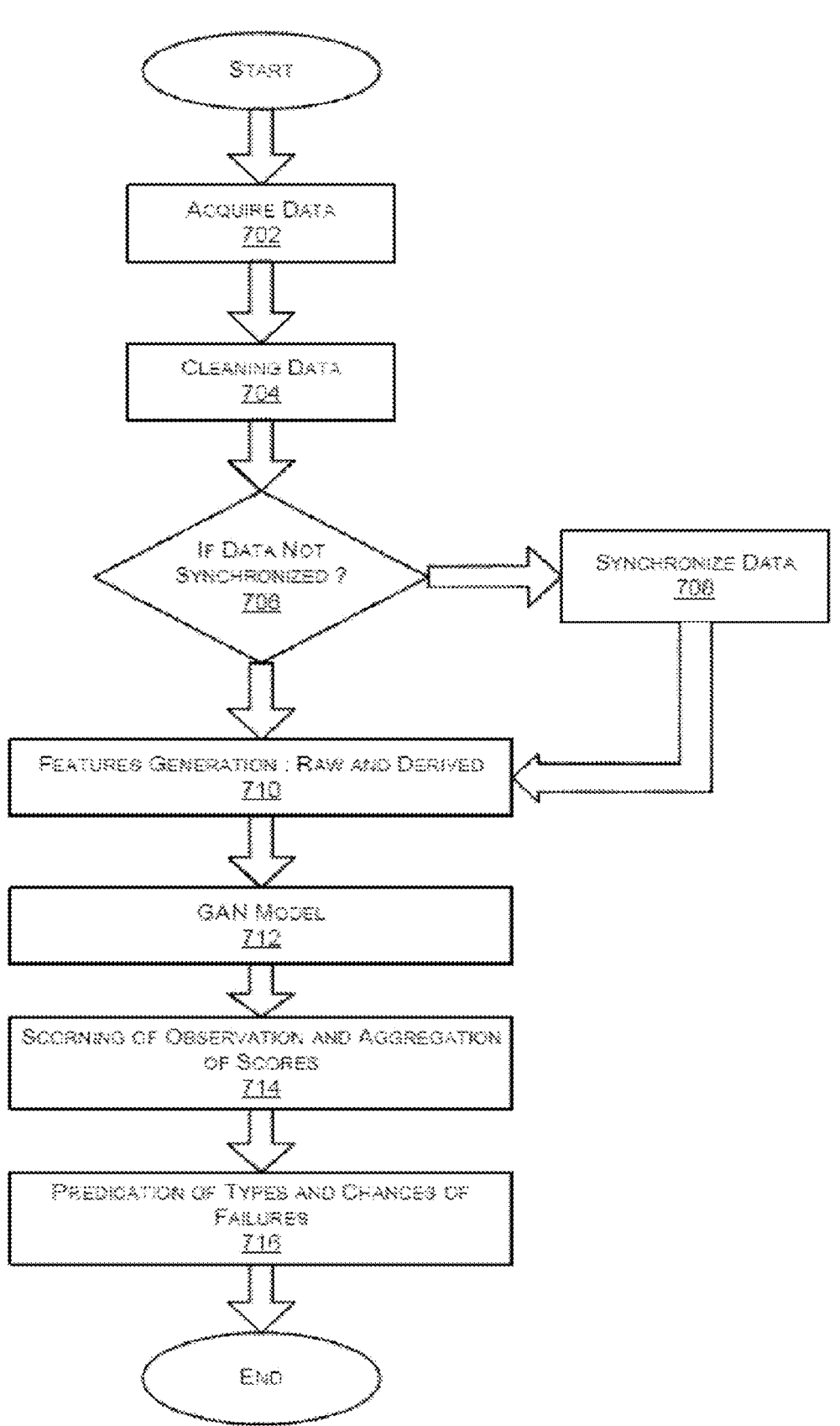
FIG. 7 illustrates an exemplary representation process flow diagram, in accordance with an embodiment of the present disclosure.

FIG. 7 illustrates an exemplary representation process flow diagram, in accordance with an embodiment of the present disclosure.

As illustrated, in an exemplary embodiment, the working steps of the predictive GMS Systems (GMS) optimizer engine with other engines/systems or subsystems may be provided below.

At step 702acquire the data: Each sensor emits data at a specific time interval. The time interval of data emission maybe different for each sensor. At step 704, analyse the data and clean the date to meet the input requirements. There can be noise or missing values in the data. Noisy data points are discovered based on the limits in which signal values should lie. After identifying noisy and missing data instances, interpolation is used to estimate the missing values.

Further at step 706, if the data is not synchronised is yes, then at step 708, synchronise the data if not synchronised. Apart from the time interval, instances at which data is emitted from sensors may not be synchronised. The asynchronous and irregular time interval data from different sensors is interpolated to a synchronous and regular time interval data. Let N be the number of sensors emitting data. After resampling and interpolation, an observation is set at each time instant ta set of values $$\{r_i^t\}_{i=1}^N,$$

where each dimension corresponds to a interpolated or original value from a sensor and its vector representation is $r^t$.

Furthermore, at step 710 Feature Generation takes place if synchronised, to create a new feature generation, i.e., the raw and derived data criteria is met. Few features may be derived by performing computations on observations of particular sensor from the interpolation step. Following types of computations are generally performed on the window of observations from sensor, depending on the performance improvements provided by those features. At step

712 apply the GAN module on the generated data and at step 714 apply observation and aggregation of scores. Furthermore, at step 716, predict the types and chances of failures.

In an exemplary embodiment, by way of example and not as limitation, different models may be evaluated by comparing metrics recall rate, precision and accuracy. Recall Rate-Recall rate is the ratio of number of failures that were detected correctly and total number of failures that actually happened.

Table I shows an example GAN engine training in accordance with an embodiment of the present disclosure.

| Number of Epochs ($N_{epoch}$) | Weight for Discriminator Function ($\lambda$) | Latent Dimension ($L_z$) | Precision | Recall | Accuracy |
|---|---|---|---|---|---|
| 100 | 0.1 | 6 | 0.99 | 0.96 | 0.99 |
| 100 | 0.1 | 6 | 0.98 | 0.95 | 0.98 |
| 100 | 0.1 | 4 | 0.98 | 0.94 | 0.94 |
| 100 | 0.1 | 4 | 0.97 | 0.93 | 0.92 |
| 100 | 0.3 | 6 | 0.98 | 0.95 | 0.98 |
| 100 | 0.3 | 6 | 0.97 | 0.94 | 0.97 |
| 100 | 0.3 | 4 | 0.96 | 0.93 | 0.95 |
| 100 | 0.3 | 4 | 0.95 | 0.92 | 0.93 |

For example, if there are $N_F$ failures and GAN mode is able to detect $N_{DC}$ then recall rate=$N_{DC}/N_F$.

Precision—It is ratio of number of failures detected correctly and Total number of failures detected. For example, GAN models detects that $N_{DF}$ failures are going to occur and only $N_{DC}$ failures actually occurred. In this case accuracy=$N_{DC}/N_{DF}$.

True Positive—A failure being detected as failure is called a True Positive, True Negative-Normal working condition being detected as normal working condition is called a True Negative. Accuracy—Accuracy is ratio of sum of true positives and true negative and Total number of decisions made. In the proposed above embodiments for the process of the GMS platform architecture for the prediction optimization, during GAN model training, the following set of parameters are explored to find a model with best performance. The numbers in the Table I may be indicative only and may be replaced with numbers from experiment.

Figure 8:
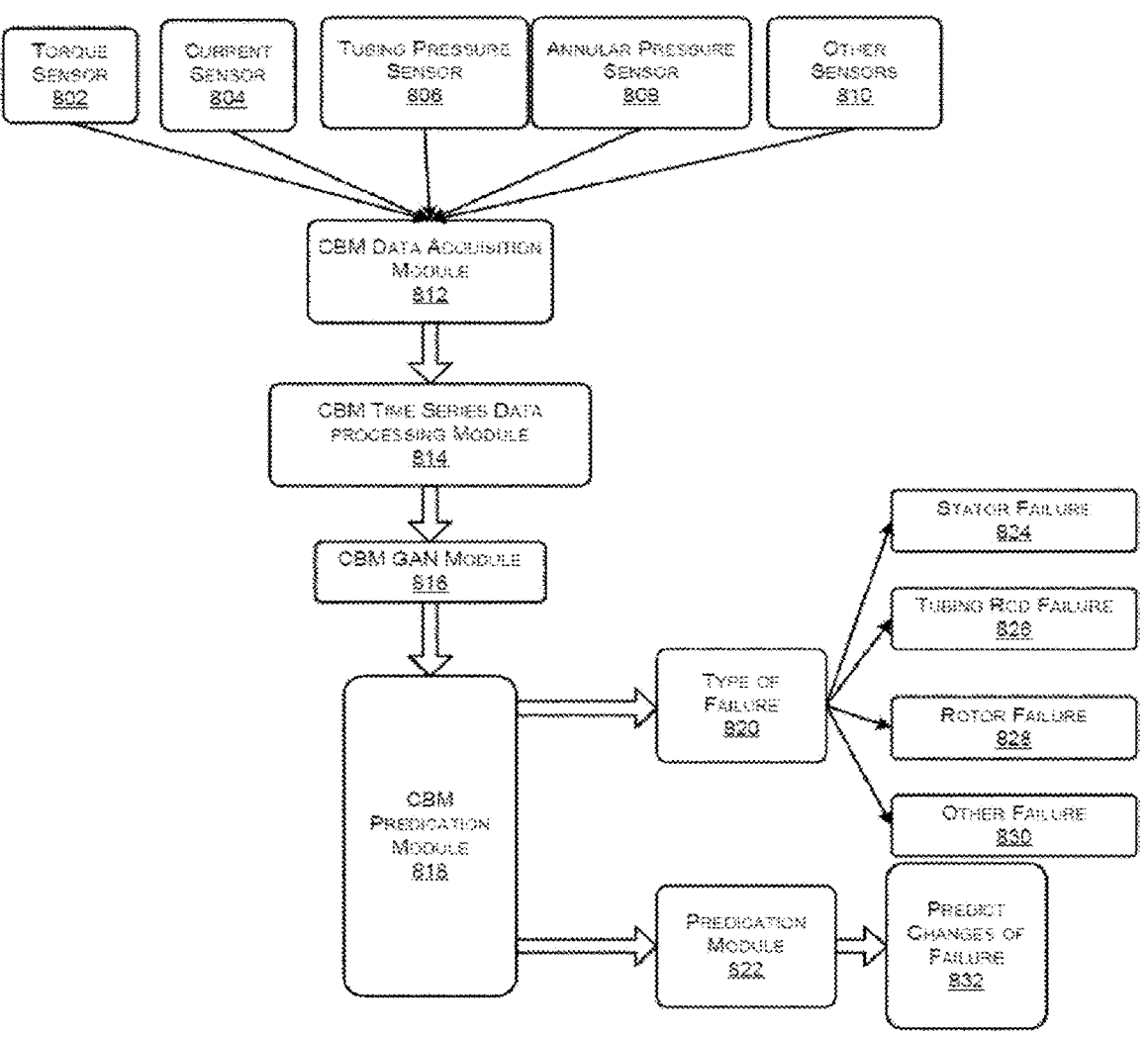
FIG. 8 illustrates an exemplary representation system architecture of PCP fault prediction engine, in accordance with an embodiment of the present disclosure.

FIG. 8 illustrates an exemplary representation system architecture of PCP fault prediction engine, in accordance with an embodiment of the present disclosure.

In an exemplary embodiment, a sample application solution of the above GMS Engine may involve the prediction of the failures in the Progressive Cavity Pump (PCP) used in Coal Bed Methane (CBM) wells for gas extraction. A forward-looking prediction of the failure signals would result in an increase in the overall operational efficiency and help in the planning of maintenance schedules to take preventive actions and reduce downtime and work over cost. The failure in PCP can happen due to sand accumulation, water accumulation and tubing puncture. These operational events affect the stator, rotor, tubing rod, internal and the external casing. Following is a subset of the sensors (IoT UEs) used in measuring the parameters during the operation of the PCP: current sensor 804, torque sensor 802, tubing pressure sensor 806, annular flow rate sensor 808, rpm sensor 810, gas flow rate sensor 810 and the water flow rate sensor 810. The following system presents a detailed flow of the GMS engine to analyse the CBM failure prediction use-case.

CBM Data Acquisition Module 812: The data acquisition engine imports/acquires data from several sensors and stores it in the staging data objects. These data objects may be managed and partitioned in a distributed environment for data processing. The sensors may record data at different time frequency levels. This data is also termed as raw data because the data stored here is not processed yet.

CBM Time Series Data Processing module 814: The data processing step encompasses most of processing of raw data into a model-consumable form. It involves filling missing values, reduction of noise, cleaning data in terms of improving the quality and then synchronising the data to bring a temporal consistency.

CBM GAN Model 816: The CBM GAN model may include of all the processes mentioned in the above sections. It may include a generator, discrimination, z-estimator and residual and discriminator loss calculations.

CBM Prediction Module 818: The CBM prediction module 818 may include aggregator and threshold systems those predict the type of failure 820 and the chances of failure 832. The type of failure may be determined based on a ranking of the probability of all the types of failures. The chances of failure may be a number between 0 and 1.0. A high value indicates that the chances of failure is high.

The foregoing examples of the related art and limitations related therewith are intended to be illustrative and not exclusive. Other limitations of the related art will become apparent to those of skill in the art upon a reading of the specification and a study of the figures. Also, the limitation is not subject to the Coal Bed Methane industry equipments as this is only an illustrative example, this may be applicable to any similar industry where the predicting failures problem in heavy equipment exists.

In another embodiment, the solution can be used to predict the failure, identify anomalies and monitor the health of devices and any other heavy or light equipments. The sensors attached to the device or equipments shall measure the operational parameters in a time sequenced manner. However, in the physical world the following is the quality of data acquired by the systems.

Advantages of the Present Disclosure

The present disclosure provides for a system and method that facilitates supervised learning models based on limited data that can predict different types of failure and pre-failure instances.

The present disclosure provides for a solution that improves upon previous methods of labelling by marking certain days data ahead of failure as belonging to failure data which will result in reduction of noisy data and improves good working condition data.

The present disclosure provides for a solution to analyse and categorise the type of failures for PC Pumps currently deployed in CBM Fields for which failure days in advance can be predicted. The present disclosure provides for a solution that helps with the prediction of the failures in the Progressive Cavity Pump (PCP) used in Coal Bed Methane (CBM) wells for gas extraction.

The present disclosure provides for a solution that helps to analyse and categorize the type of failures for any similar equipment for which failure days in advance can be predicted.

The present disclosure provides for a better optimal solution to increase the accuracy of prediction and where false positive and false negative should be minimal.

The present disclosure provides for a solution that can cut down lease operating expense of equipments, decrease deferred production of gas, reduce non-productive time, alleviate hiring constraints, improve cash flow in uncertain environment and provide sustainable economic production, maximize reserves recovery, etc. by predicting the failures of equipment.

The present disclosure provides for a mechanism that facilitates a seamless enhancement of prediction analysis to provide informative output for precision and decision services on wireless network including but not limited to 5G/4G/3G/EV-Do/eHRPD capable technology.

The present disclosure provides for a mechanism that facilitates a seamless enhancement of prediction optimization analysis to provide informative output for precision and decision services in the user devices independent of whether the UE is 5G/4G/3G/EV-Do/eHRPD capable technology.

The present disclosure provides value-added services to explorers by predicting the operational challenge and save cost.

We claim:

1. A system for facilitating prediction of wear and tear and future failure of components associated with gas extraction in a mining well, said system comprising:

one or more user equipment communicatively coupled to Coal Bed Methane (CBM) wells for gas extraction;

one or more sensors coupled to one or more pumps in the mining well;

wherein the one or more user equipment comprises of one or more processors that execute a set of executable instructions that are stored in a memory, upon which execution, the processor causes the system to:

acquire a set of data packets from one or more sensors, by a data acquisition engine, wherein the set of data packets are received at synchronous and asynchronous instances of time;

extract a set of attributes, by a feature generation engine, from the synchronised data packets, wherein the feature generation engine is configured to generate features from the extracted set of attributes associated with interpolation of the received data packets;

evaluate, by a generative adaptive network (GAN) engine, a set of model parameters based on the generated features of the extracted set of attributes; and predict, by a prediction engine, failures associated with the received set of data packets based on the evaluation of the set of model parameters.

2. The system as claimed in claim 1, wherein the mining well comprises an oil, a methane, a coal bed or a combination thereof.

3. The system as claimed in claim 1, wherein the received data packets are synchronized by converting the received data packets to a synchronous and regular time interval data packets.

4. The system as claimed in claim 1, wherein the GAN engine is configured to detect anomalies associated with the set of model parameters.

5. The system as claimed in claim 2, wherein the one or more user equipment comprises a SIM, wherein the SIM comprises elementary files and location parameters associated with the one or more user equipment.

6. The system as claimed in claim 1, wherein a GAN training engine is configured to monitor and update the one or more model parameters such that the system is configured to train itself to obtain the one or more model parameters to predict anomalies and generate failure data over a plurality of time interval.

7. The system as claimed in claim 1, wherein the GAN training engine is configured to label the failures by marking certain days data ahead of failure as belonging to failure data.

8. A method for facilitating prediction of wear and tear and future failure of components associated with gas extraction in a mining well, said method comprising:

acquiring, by the data acquisition engine, a set of data packets from one or more sensors, wherein the set of data packets are received at synchronous and asynchronous instances of time;

extracting, by a feature generation engine, a set of attributes from the acquired set of data packets, wherein the feature generation engine is configured to generate features from the extracted set of attributes associated with interpolation of the acquired data packets;

evaluating, by a generative adaptive network (GAN) engine, a set of model parameters based on the generated features of the extracted set of attributes; and predicting, by a prediction engine, failures associated with the received set of data packets based on the evaluation of the set of model parameters.

9. The method as claimed in claim 8, wherein the predicted failures are labelled and categorised for planning.

10. The method as claimed in claim 8, wherein erroneous or corrupted data and missing data are identified, and wherein interpolation is used to estimate the erroneous or corrupted data and missing data.

11. The method as claimed in claim 8, wherein model parameters evaluated by the GAN engine corresponds to recall rate, precision and accuracy, wherein recall rate is associated with number of failures detected correctly to total number of actually occurred failures, wherein precision is associated with number of failures detected correctly and total number of failures detected.

* * * * *